United States Patent [19]

Leonhart et al.

[11] Patent Number: 5,001,514
[45] Date of Patent: Mar. 19, 1991

[54] OVERHEAD EXPOSURE UNIT

[75] Inventors: Charles J. Leonhart, Schaumburg, Ill.; G. B. Kirby Meacham, Shaker Heights, Ohio

[73] Assignee: nuArc Company, Inc., Niles, Ill.

[21] Appl. No.: 399,909

[22] Filed: Aug. 29, 1989

[51] Int. Cl.⁵ .............................................. G03B 27/02
[52] U.S. Cl. ...................................................... 355/79
[58] Field of Search .................. 355/79, 86, 118, 113, 355/114–117, 75, 18, 54, 55, 56

[56] References Cited

U.S. PATENT DOCUMENTS

| | | | |
|---|---|---|---|
| 2,679,189 | 5/1954 | Burns | 355/56 X |
| 4,080,070 | 3/1978 | Spence-Bate | 355/75 |
| 4,218,137 | 8/1980 | Smith et al. | 355/118 X |
| 4,676,630 | 6/1987 | Matsushita et al. | 355/53 |
| 4,764,794 | 8/1988 | Fujii | 355/91 X |
| 4,811,059 | 3/1989 | Hamaski et al. | 355/53 X |

Primary Examiner—L. T. Hix
Assistant Examiner—D. Rutledge
Attorney, Agent, or Firm—Mason, Kolehmainen, Rathburn & Wyss

[57] ABSTRACT

An overhead exposure unit includes a light source for exposing sheets of light sensitive material carried on a supporting table. The light source is mounted at a fixed elevation above a floor or other surface and a support system is provided for moving the film support table up and down beneath the light source to provide the desired distance between the light source and the film for making plates or other photographic reproductions. The film support table is movable between a convenient working level and is raised or lowered to the selected level to provide a desired spacing or distance between the light source and the film while controlled light exposure takes place.

16 Claims, 6 Drawing Sheets

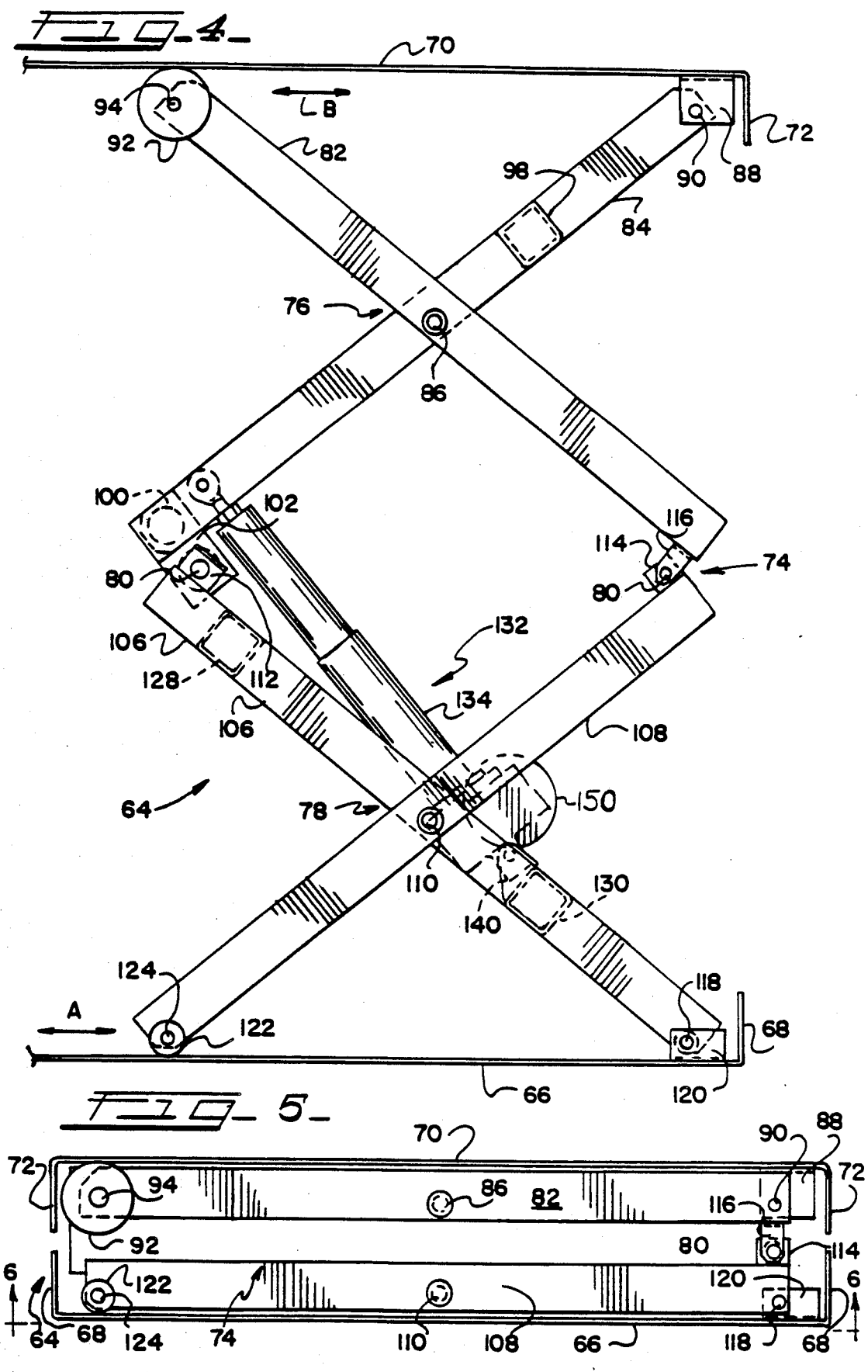

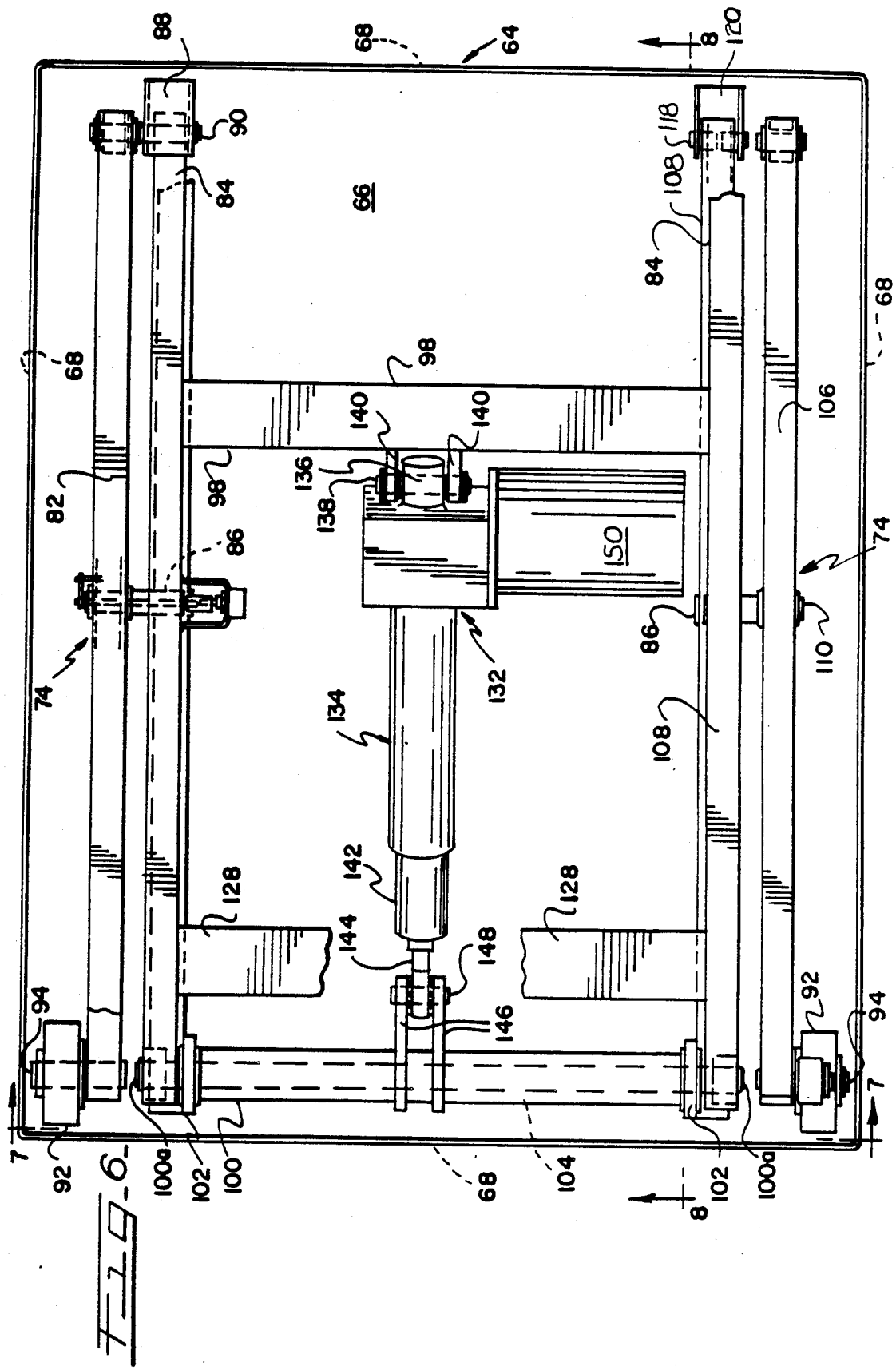

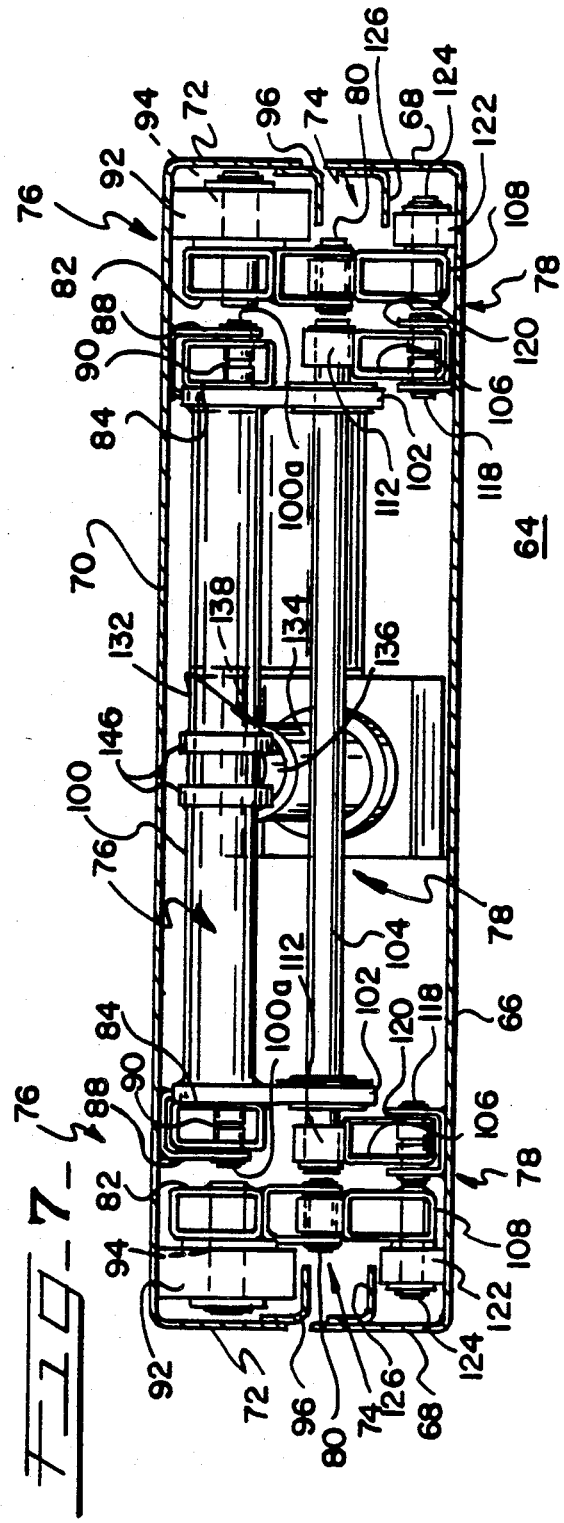
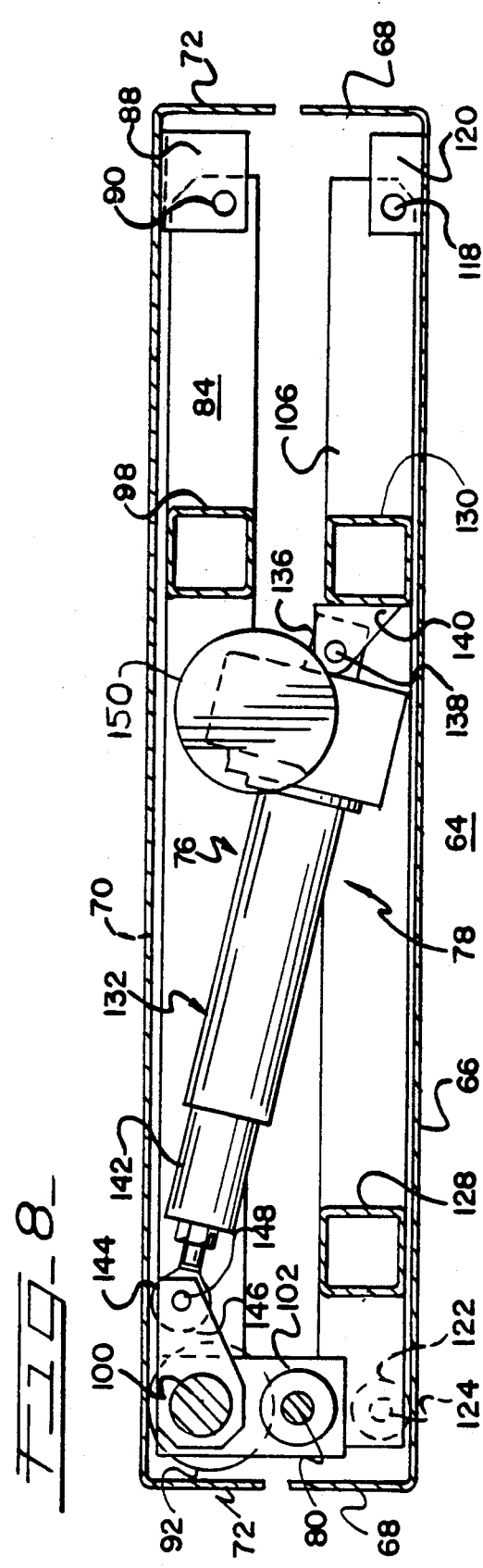

OVERHEAD EXPOSURE UNIT

BACKGROUND OF THE INVENTION

1. Field of the Invention

The present invention relates to overhead exposure units and platemakers used for making photo reproductions in the graphic arts.

2. Background of the Prior Art

A variety of different overhead exposure units have been provided for making plates or other photographic reproductions on films and light sensitive sheet material. In general, film manufacturers recommend a light source to film distance of a certain value to provide optimum results in terms of uniformity of light distribution, light collimation requirements and exposure duration, etc. The distance recommendations may vary due to a number of factors such as exposure latitude of the film, size of the film to be exposed, number of overlays through which exposures are made, design of the exposure unit lamp and reflector system.

Some graphic art equipment manufacturers provide exposure units which adjust the distance between the light source and film by moving the light source closer to or further away from the film which is generally held in a vacuum frame on a stationary table or the like. In many instances, it is normal to recommend a minimum light source to film distance of 72 inches and considering that many graphic art studios are located in conventional rooms having a nominal eight foot high ceiling, it has been difficult to provide an overhead exposure unit which would accommodate a light source to film distance of 72 inches. Moreover, it is desirable for speed of reproduction to have a support table and vacuum frame at a convenient working level of approximately 36 inches above the floor on which the operator is standing. Assuming that approximately 12 inches may be required from the lamp to the ceiling in an eight foot high room ceiling, it has been difficult to provide an overhead exposure unit with both a light source to film distance of 72 inches and a table mounted at a convenient working level of about 3 feet above the floor.

OBJECTS OF THE INVENTION

Accordingly, it is an object of the present invention to provide a new and improved overhead exposure unit of the character described which is capable of use within a room having an eight foot nominal ceiling height and yet still capable of providing a light source to film distance of 72 inches or more.

It is another object of the present invention to provide an overhead exposure unit of the character described which has an overhead light source supported at a fixed elevation above the floor and a table for supporting the vacuum frame and film which is movable to different levels spaced below the light source.

Yet another object of the present invention is to provide a new and improved overhead exposure unit of the character described wherein a movable table is provided within an enclosure or a cabinet beneath a light source maintained at a fixed level and wherein the table is movable from a convenient working height of approximately 36 inches above the floor to a higher or a lower exposure position wherein a light source to film distance of 72 inches is provided.

Still another object of the present invention is to provide a new and improved overhead film exposure apparatus which is easy to use and which facilitates high production rates by providing a work table movable to different levels between a convenient working level about 3 feet above the floor and several lower elevations downwardly thereof to provide a six foot light source to film exposure distance.

Yet another object of the present invention is to provide a new and improved overhead exposure unit of the character described which will readily fit within a room or building having nominal eight foot high ceilings yet without reducing the spacing between a light source and film to less than a minimum of six feet.

Yet another object of the present invention is to provide a new and improved overhead exposure unit of the character described which is neat in appearance, fast in operation and relatively low in cost yet capable of producing high quality photographic reproductions.

BRIEF SUMMARY OF THE INVENTION

The foregoing and other objects and advantages of the present invention are accomplished in a new and improved overhead exposure unit of the character described which includes a light source for exposing a sheet of light sensitive film material supported above a horizontal table at a convenient working level above a floor. The light source is mounted at a fixed elevation above the floor and directs a controlled amount of light for exposing the film downwardly. One or more image forming films and a sheet of photosensitive film are carried in a vacuum frame system mounted on the table. After the image forming film and photosensitive sheets are in place, the table is moved downwardly from a working level of about 3 feet to a higher or a lower exposure position for a controlled exposure to light emanating from the fixed level light source. The table is mounted on a support mechanism for movement between several selected parallel horizontal positions spaced downwardly away and generally centered below the fixed level light source. After an exposure has been completed, the table is elevated back to the working level wherein the films are removed and replaced with new sheets ready for subsequent exposure operations.

BRIEF DESCRIPTION OF THE DRAWINGS

For a better understanding of the present invention, reference should be had to the following detailed description taken in conjunction with the drawings, in which:

FIG. 4 is an enlarged front elevational view of a table support mechanism of the overhead exposure unit shown in an elevated position;

FIG. 5 is a front elevational view of the table support mechanism shown in a contracted position;

FIG. 6 is a cross-sectional view taken substantially along line 6—6 of FIG. 5;

FIG. 7 is a cross-sectional view taken substantially along line 7—7 of FIG. 6; and FIG. 8 is a cross-sectional view taken substantially along lines 8—8 of FIG. 6.

DETAILED DESCRIPTION OF A PREFERRED EMBODIMENT OF THE INVENTION

Figure 1:
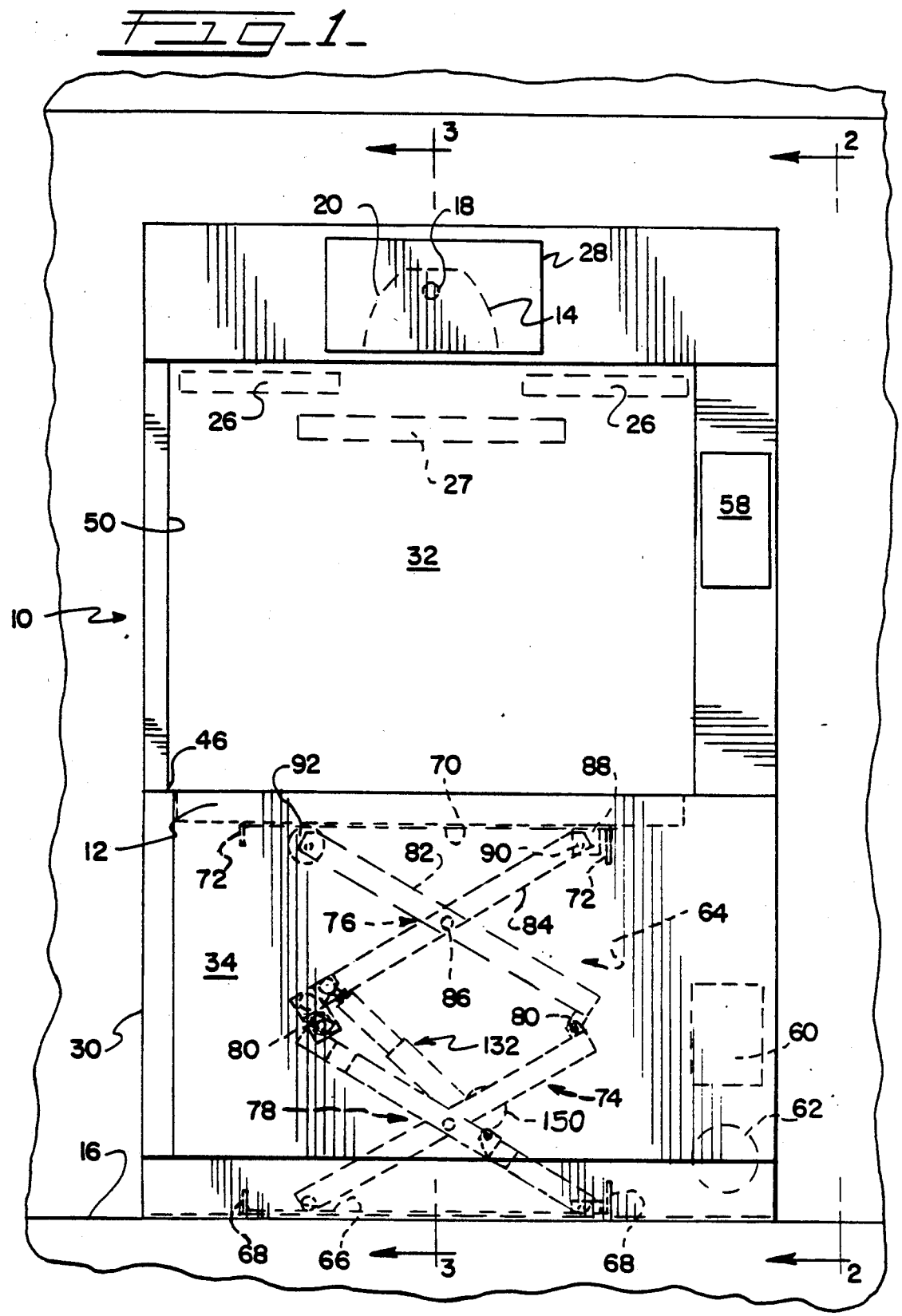
FIG. 1 is a front elevational view of an overhead exposure unit constructed in accordance with the features of the present invention.

Referring now more particularly to the drawings, therein is illustrated a new and improved overhead exposure unit 10 constructed in accordance with the features of the present invention and especially designed to provide controlled light for exposing sheets of light sensitive film material supported in a horizontal position on a flat table surface below an overhead lamp unit 14 which is mounted at a fixed level above a floor or other datum 16.

The lamp unit 14 includes a lamp or light source 18 and reflector 20 for directing a beam of light indicated by the ray lines 22 and 24 (FIG. 3), downwardly through a filter 26 (if desired) toward an upper surface of the table 12. The lamp unit 14 is supported in a slide-out drawer 28 mounted for horizontal sliding movement in the upper end portion of a generally rectangular cabinet 30.

Preferably, the cabinet 30 is formed of sheet metal and includes a rectangular-shaped back wall 32, a front wall, and a pair of opposite sidewalls 36, a top wall 38 and a bottom wall 40 resting on the floor surface 16. As indicated in FIGS. 2 and 3, the front wall 34 is provided with an indented lower portion 42 to accommodate the feet of an operator 44 in a standing position adjacent the front wall of the cabinet 30 during operation.

Figure 3:
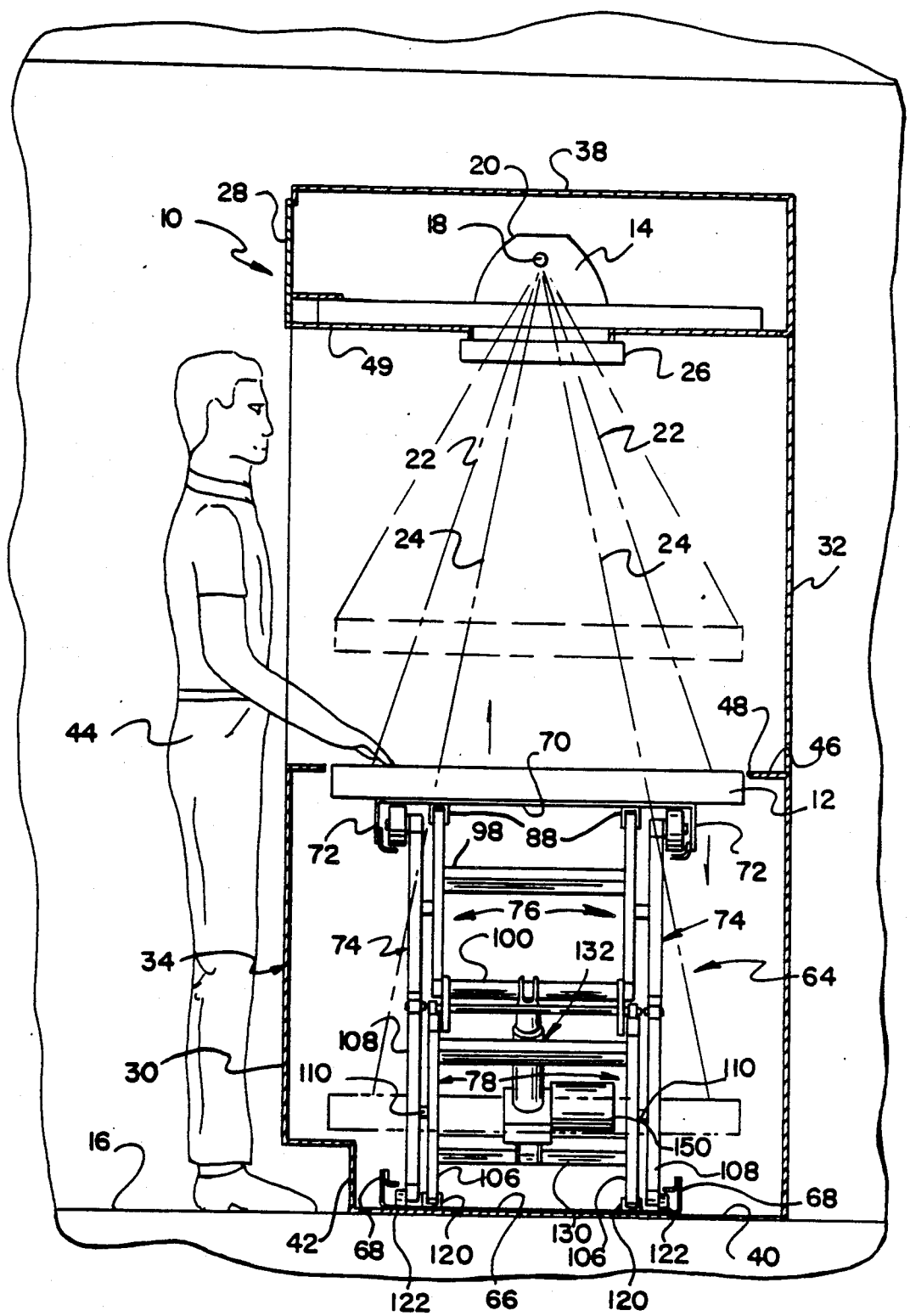
FIG. 3 is a cross-sectional view of the overhead exposure unit taken substantially along lines 3—3 of FIG. 1.

As illustrated best in FIG. 3, the interior of the cabinet 30 is provided with a rectangular stiffening frame 46 secured to the inside surface of the walls 32, 34 and 36 at a convenient working level about 3 feet above the level of the floor surface 16. The stiffening frame defines a large rectangular table opening 48 which is dimensioned to be slightly larger in size than the table 12 so that the table rest even therewith in a working position as illustrated best in FIGS. 1 and 3.

The cabinet 30 also includes a false ceiling wall 49 spaced below the upper cabinet wall 38 for supporting the slide-drawer 28 holding the lamp unit 14. The front wall 34 is formed with a large rectangular access opening 50 extending upwardly from the working level of the stiffening frame 46 to the lower level of the false top wall 49 permitting an operator 44 to conveniently work with film sheets and the like on a vacuum blanket (not shown) that is mounted on the movable table 12. Preferably, the vacuum blanket of the type shown and described in copending United States patent application Ser. No. 353,055, filed May 17, 1989, and assigned to the same assignee as the present application. Other types of vacuum blankets or devices can be mounted on the table 12 to hold the film sheets in proper registration for exposure from the lamp 18 during time and light intensity controlled exposure cycles.

Figure 2:
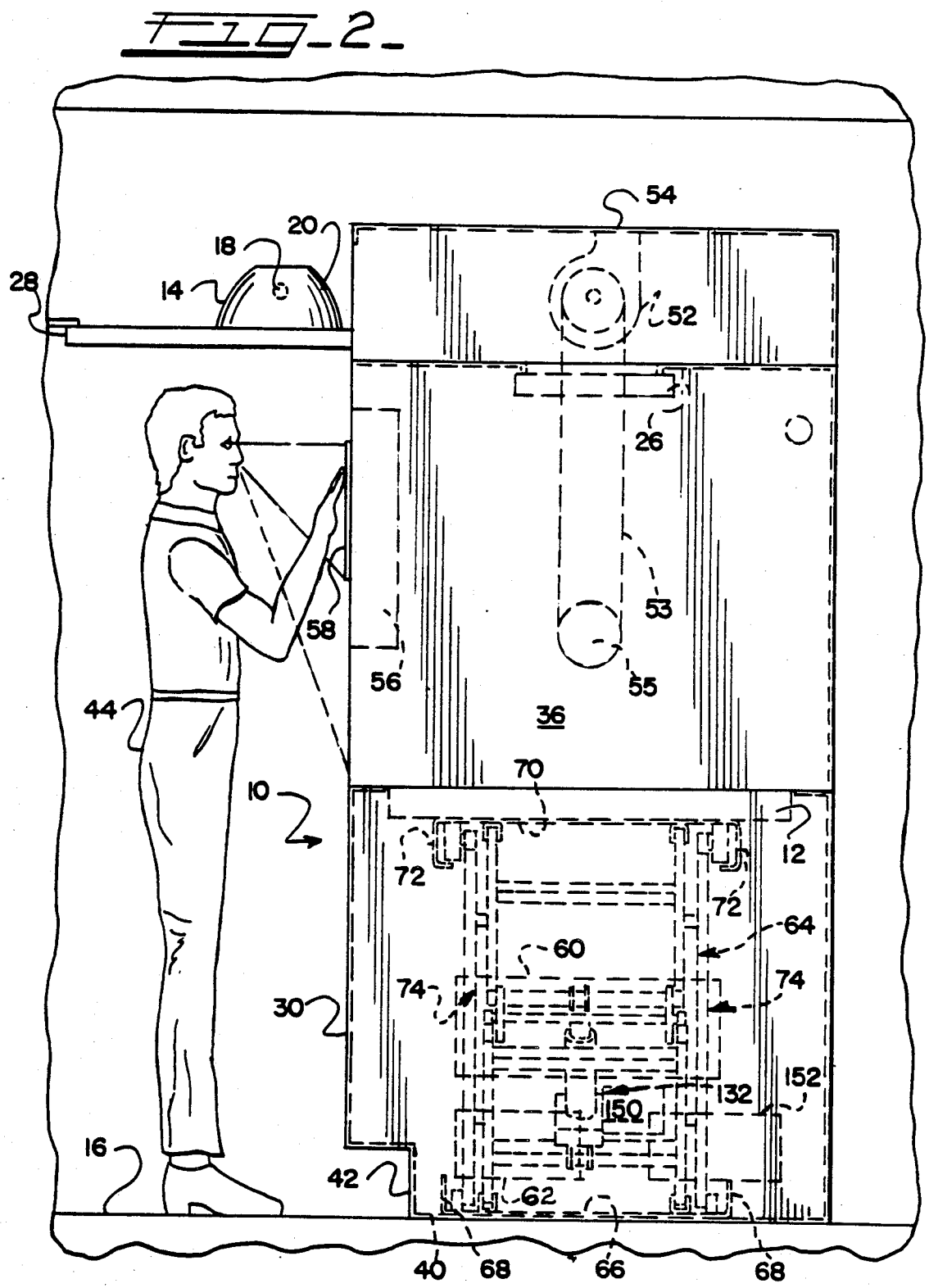
FIG. 2 is a side elevational view of the overhead exposure unit looking in the direction of arrows 2—2 of FIG. 1.

Considering that the overhead exposure unit 10 is designed for universal use in large buildings as well as small studios and rooms, some having a nominal eight foot high ceiling, the overall height of the cabinet 30 is less than eight feet and generally the lamp and lamp drawer require about 12" high a space below the top wall 38 to provide for cooling and other equipment such as a fan or blower 52 having a duct 53 connected to an inlet side of the blower for removing heat and hot air from the interior of the cabinet 30 via an inlet opening 55 for discharge through an outlet vent opening 54 connected to the outlet side of the blower 52 as best shown in FIG. 2.

As viewed in FIG. 1, the cabinet 30 has a wide frontal face between the adjacent right hand vertical edge of the access opening 50 and the right hand sidewall 36 in order to accommodate the exhaust duct 53 and to accommodate a control box 56 having a front mounted control panel 58 spaced adjacent the eye level of an operator 44 as shown in FIG. 2. In addition, space on the right hand side of the cabinet 30 as viewed in FIG. 1 provides room for a power supply unit 60 for the lamp unit 14 and a vacuum pump 62 for operating the vacuum blanket and vacuum frame assembly of the exposure unit 10 (not shown).

In accordance with the present invention, the overhead exposure unit 10 includes a table support structure 64 constructed in accordance with the features of the present invention and mounted in a lower portion of the cabinet 30 for moving the table 12 between an upper work level position (solid lines, FIG. 3), a higher exposure position and a lower or fully retracted exposure position (dotted lines) wherein a minimum of elevation between the table 12 and the bottom wall 40 of the cabinet 30 is provided to assure a relatively large or maximum distance between the light or lamp 18 and the film and sheet material mounted on the upper surface of the table 12 for controlled light exposure.

The table support structure 64 includes a lower base 66 of rectangular shape having an integral upturned peripheral side flange 68 around the outer edge, forming a pan-like structure which is secured in place on the bottom wall 40 of the cabinet 30 and centered beneath the table opening 48 in the intermediate level frame 46. The table support structure 64 also includes an upper plate 70, also of rectangular shape underlying and supporting the table 12 which is directly secured thereto. The upper plate 70 includes a downwardly extending, integrally formed, peripheral edge flange 72 adapted to match the edge flange 68 of the lower plate 66 as best shown in FIGS. 5, 7 and 8.

The lower base plate 66 and the upper plate 70 are continuously maintained in precise parallel horizontal alignment and in generally centered alignment directly below the lamp unit 14 by means of two pairs of scissors mechanisms 74 spaced on opposite sides of the plates 66 and 70 and interconnecting the plates to insure continuous parallel movement in relation to one another. Each scissors mechanism 74 includes an upper linkage system 76 and a lower linkage system 78 (FIG. 4) pivotally interconnected by a pair of pivot pins or axles 80 as best shown in FIG. 4.

Each upper linkage set includes a pair of elongated, hollow, tubular steel link members 82 and 84 pivotally interconnected at their midpoints by a pivot pin 86. As illustrated in FIG. 7, the elongated link members 82 and 84 comprise hollow metal tubes having a generally rectangular cross-section to provide the needed stiffness in structure so that the base plate 66 and upper plate 70 of the table support mechanism 64 move in precise parallelism. An upper end portion of the upper links 84 is pivotally secured to brackets 88 fixedly attached to the underside of the upper plate 70 by pivot pins 90. At the upper end, each of the upper links 82 supports a cylindrical roller 92 journalled on a roller pin 94 extending outwardly of the link member 82 at right angles as best shown in FIG. 7. The upper rollers 92 are adapted to engage and roll along the underside of the upper plate 70 and a lower guide angle 96 is attached along the peripheral side flanges 72 on opposite sides of the upper plate 70 to form a guide track for limiting the possibility of downward movement of the upper rollers 92 away from contact with the underside of the upper plate 70.

The upper links 84 of the upper linkage assembly 76 are interconnected by a transverse cross member 98 at a level above the pivot pins 86 and at the lower ends, the links 84 are interconnected by a transversely extending cylindrical shaft 100 having stub axles 100a of smaller diameter at outer ends engaged in recesses in the respective links 84. At opposite ends of the large diameter shaft 100 downwardly projecting heavy metal brackets 102 are provided and these brackets support a transverse pivot axle 104 extending between opposite upper ends of a pair of lower link members 106 of the lower scissors linkage assembly 78. The lower scissors linkage assembly 78 also includes pairs of lower links 108 pivotally interconnected at the midpoint to the lower links 106 by pivot axles 110. The upper end of the lower pivot links 106 is provided with an upstanding bracket 112 supporting a pivot axle 80 forming an outer end portion of the transverse shaft 104 for interconnecting the lower linkage assembly 78 to the upper linkage assembly 76. Similarly the upper end portion of the lower links 108 are provided with brackets 114 for pivotal interconnection with the pivot pins 80 carried on brackets 116 at the lower end of the upper links 82 as best shown in FIGS. 4, 5, 6, 7 and 8.

The lower ends of the lower pivot links 106 are pivotally supported on axle pins 118 mounted on brackets 120 fixedly secured to the upper surface of the lower base plate 66. The lower ends of the lower links 108 are provided with relatively small diameter rollers 122 carried on pins 124 extending outwardly of the link members 108 as shown in FIG. 7. The lower rollers 122 are movable toward and away from the fixed brackets 120 as indicated by the arrow A, FIG. 4 and similarly the upper rollers 92 engaging the upper plate 70 move back and forth as indicated by the arrow B as the table support structure 64 is activated to raise and lower the table 12.

As shown in FIG. 7, guide angles 126 are secured to opposite upstanding side flanges 68 on the lower base 66 to provide a guide track for confining movement of the rollers 122 in a horizontal direction whenever the table support structure 64 is activated to raise or lower the table 12. To provide rigidity for the lower linkage assembly 78, the lower links 106 are transversly interconnected by a pair of upper and lower transverse cross members 128 and 130 spaced above and below the interconnecting pins 110 between centers of the pairs of lower links 106 and 108 of the lower scissors assembly 78.

In accordance with the present invention, in order to move the table 12 between a working level approximately 36 inches above the floor or datum 16 and substantially even with the midcabinet frame 46, the table support structure 64 includes a linear electromechanical actuator system indicated generally by the reference numeral 132 including an elongated jackscrew assembly 134 having a base end 136 pivotally interconnected by a pin 138 to a pair of support brackets 140 mounted at spaced apart locations on a transverse cross member 130 extending between lower link members 106.

At the opposite end, the jackscrew assembly 134 includes a linearly movable element 142 having a clevis 144 on the outer end pivotally interconnected to a pair of brackets 146 by a pin 148. The brackets 146 are secured to the large diameter transverse shaft 100 adjacent the center thereof so that when the lower end of the actuator 132 is energized in one direction, the element 142 is extended outwardly and raises the upper plate 70 from a lower or retracted position (FIGS. 5, 7 and 8) to an upper position as shown in FIGS. 1-4 wherein the upper surface of the table 12 reaches a convenient working level approximately 36 inches above the floor 16 or other datum. When the actuator 132 is subsequently energized in an opposite direction the element 142 is retracted and the upper and lower scissor mechanism 76 and 78 begin to contract in height to lower the level of the table 12 until a desired level is attained in order to provide a desired spacing distance between the fixed level light 18 and film sheets placed on the table 12 for copy and platemaking operations. A vacuum frame assembly of the type shown and described in U.S. copending patent application Ser. No. 369,334, filed June 21, 1989, assigned to the same assignee as the present application may be mounted on the table 12 to secure the film sheets in place.

The actuator system 132 includes a built-in electric motor and ball screw mechanism for converting rotary motion to linear motion contained in a compartment 150 mounted at the lower end of the assembly 134 in a manner well known in the art. Control of the jackscrew assembly 134 to extend or retract the elongated member 142 to set up a selected level of table height above the floor or datum 16 is provided from the control panel 58 mounted on the front side of the cabinet 30 of the overhead exposure unit 10. As shown in FIG. 2, the lower portion of the cabinet 30 contains an electrical system 152 mounted behind the vacuum pump 62 and flexible lines are interconnected between the system and the ball screw mechanism and motor contained within the housing 150. A suitable linear electromechanical actuator system 132 is manufactured by Motion Systems Corporation of Shrewsbury, N.J., and generally similar units are available from other suppliers. The system 132 is powered by a built-in electric motor and a ball screw converts the rotary motion to linear motion and provides mechanical advantage. Further mechanical advantage is provided by a worm gear reduction between the motor and the screw. The non-backing characteristics typical of a worm gear, combined with a brake in the motor, allow the actuator to hold the load in an unenergized state. A potentiometer connected to the scissors linkage system 74 measures the vertical position of the actuator assembly 134, and allows a controller to position the table 12 at any intermediate position desired. End of travel is detected by a pair of limit switches and the actuator will freewheel at end of travel to provide additional protection against motor stalling or overstressing the mechanical components. A hydraulic system may also be used to power and control the scissors lift mechanism 74 and other types of linear motion devices could be used to move the scissors linkage mechanism.

In a prototype overhead exposure unit 10 constructed in accordance with the present invention, the cabinet 30 had a height of 86 inches so it could be used in conventional rooms or spaces having an eight foot high ceiling. The lamp 18 is positioned at an elevation of 80 inches above the floor or datum 16 and the table 12 in an upper or working level position is spaced at an elevation of 36 inches above the floor or datum 16. The exposure distance between the lamp 18 and surface of the table 12 in a working level position is 44 inches and the table support mechanism 64 may be activated to raise or lower the table level to a selected one of several higher or lower level positions to provide 51, 60, 72, etc., inches of exposure distance below the fixed level of the lamp 18. A six foot or 72 inch spacing between the lamp 18 and the surface of the table 12 provides an exposure distance great enough to meet the requirements of most film manufacturers and lamp manufacturers.

The table 12 rather than the lamp 18 is movable between a plurality of positions, parallel of the floor ranging from an elevation of 8 inches to 36 inches and the table may be stopped and maintained at any intermediate position therebetween, held in a selected position by the actuator system 132. Control of table elevation is thus precise and an operator 44 can conveniently work on copy making operations while the table is 36 inches above the floor. The unique scissors mechanisms 76 and 78 making up the table support 64 provide a precise parallelism between the table positions in a range of elevations between the 8 and 36 inch height levels and at the same time, a central portion of the table 12 remains substantially centered below the lamp 18 as the table is moved up and down.

Many modifications and variations of the present invention are possible in light of the foregoing specification and thus, it is to be understood that within the scope of the appended claims, the invention may be practiced otherwise than as specifically described.

What is claimed and desired to be secured by Letters Patent of the United States is:

1. A photographic platemaker for use with a sheet of light sensitive material, comprising:
   cabinet means including a light source supported at a fixed level above a datum for directing light downwardly toward said sheet;
   table means in said cabinet means for supporting said sheet for movement between a plurality of levels below said light source, said table means including an upper table and a lower base, and support linkage interconnecting said table and base for maintaining said table parallel of said base at said plurality of levels; and
   means for moving said table means to a selected one of said level.

2. The photographic platemaker of claim 1, wherein: said table is movable between a convenient working level and one or more different levels for exposing said sheet to light from said light source.

3. The photographic platemaker of claim 1, wherein: said cabinet means includes an access opening between said light source and said table means in an upper one of said plurality of levels.

4. The photographic platemaker of claim 1, wherein: said table means includes a base at a lower end of said cabinet means, a table above said base movable downwardly of said upper one of said plurality of levels toward said base and support linkage interconnected between said base and table for maintaining said table parallel of said base at said plurality of levels.

5. The photographic platemaker of claim 3, wherein: said support linkage comprises a plurality of scissors mechanisms interconnecting adjacent edges of said table and said base.

6. The photographic platemaker of claim 5, wherein: said means for moving said table means includes linear motion means for extending and contracting said scissors mechanisms for raising and lowering said table.

7. The photographic platemaker of claim 6, wherein: each of said scissors mechanisms includes a plurality of pivotally interconnected support links; and
   said means for moving said table means includes extendable means interconnected between said pivotally interconnected support links.

8. The photographic platemaker of claim 7, wherein: each of said scissors mechanisms includes two pairs of said pivotally interconnected support links; and
   said extendable means is interconnected to move one of said pairs of links relative to the other of said pair of links.

9. Exposure apparatus, comprising:
   light source means for exposing a sheet of light sensitive material;
   first means for supporting said light source at a stationary elevation above a datum;
   table means for supporting said sheet of light sensitive material between said light source and said datum;
   second means for supporting said table means in a selected one of several parallel positions for exposure to light from said source, said second means including means for moving said table means toward and away from said light source; and
   means for maintaining said table means in continuous parallelism with said parallel positions when moved toward and away from said light source, said means for maintaining said table means in parallelism including means for maintaining said table means in a substantially centered relationship below said light source when moved toward and away from said light source.

10. The exposure apparatus of claim 9, wherein: said means for moving said table means including a linear motion device interconnected with said means for maintaining said table means in parallelism.

11. The exposure apparatus of claim 9, wherein: said means for maintaining said table means in parallelism includes at least a first pair of pivotally interconnected links pivotally interconnected with each opposite edge of said table means.

12. The exposure apparatus of claim 11, wherein: said means for maintaining said table means in parallelism includes at least a second pair of pivotally interconnected links pivotally interconnected with each of said first pair of links.

13. The exposure apparatus of claim 11, wherein: said links of said first pair are pivotally interconnected to one another intermediate their opposite ends.

14. The exposure apparatus of claim 13, wherein: lower opposite ends of said interconnected pivotally interconnected pairs of links are movable toward and away from one another when raising and lowering said table means.

15. The exposure apparatus of claim 9, wherein: said table means is movable between a convenient working level and one or more different levels spaced a different distance from said light source means.

16. The exposure apparatus of claim 12, wherein: said means for moving said table means includes linear motion means pivotally interconnected between said first and second pair of links.

* * * * *